United States Patent
Quanz

(10) Patent No.: US 7,214,009 B2
(45) Date of Patent: May 8, 2007

(54) DRILLING TOOL

(75) Inventor: Reiner Quanz, Remscheid (DE)

(73) Assignee: Reiner Quanz GmbH & Co., Remscheid (DE)

( * ) Notice: Subject to any disclaimer, the term of this patent is extended or adjusted under 35 U.S.C. 154(b) by 521 days.

(21) Appl. No.: 10/778,522

(22) Filed: Feb. 16, 2004

(65) Prior Publication Data

US 2004/0179912 A1    Sep. 16, 2004

(30) Foreign Application Priority Data

Mar. 5, 2003    (DE) .......................... 203 03 601 U

(51) Int. Cl.
  *B23B 51/08* (2006.01)
  *B23G 5/06* (2006.01)
  *B23G 5/20* (2006.01)

(52) U.S. Cl. .................... 408/222; 76/101.1; 76/108.1; 76/115; 408/144; 408/224; 470/199

(58) Field of Classification Search ................ 408/222, 408/199, 215–216, 144, 224, 225, 226; 470/183, 470/198, 199; 76/101.1, 115, 108.1, 108.6; *B23G 5/06, B23G 5/20; B23B 51/08, 51/10, 51/02*

See application file for complete search history.

(56) References Cited

U.S. PATENT DOCUMENTS

| | | | |
|---|---|---|---|
| 2,740,974 A | | 4/1956 | Lewis |
| 3,346,894 A | | 10/1967 | Lemelson |
| 3,362,802 A | * | 1/1968 | Ellis ............................ 428/564 |
| 3,555,937 A | * | 1/1971 | Nicodemas ................... 408/59 |
| 4,008,976 A | * | 2/1977 | Holzl .......................... 408/144 |
| 4,704,055 A | * | 11/1987 | Guhring ....................... 408/59 |
| 5,145,018 A | * | 9/1992 | Schimke et al. ............. 175/385 |
| 5,797,711 A | * | 8/1998 | Mulgrave et al. ........... 408/226 |
| 5,971,674 A | * | 10/1999 | Holley ......................... 408/59 |
| 6,652,202 B2 | * | 11/2003 | Remke et al. ............... 408/214 |

FOREIGN PATENT DOCUMENTS

| | | | |
|---|---|---|---|
| DE | 3246663 A1 | * | 6/1984 |
| DE | 92 16 228.2 | | 2/1993 |
| DE | 19652505 A1 | * | 6/1998 |
| JP | 54013427 A | * | 1/1979 |
| JP | 2001170819 A | * | 6/2001 |
| WO | WO 94/14575 | | 7/1994 |
| WO | WO 00/27578 | | 5/2000 |

* cited by examiner

*Primary Examiner*—Daniel W. Howell
(74) *Attorney, Agent, or Firm*—Brinks Hofer Gilson & Lione

(57) ABSTRACT

A drilling tool consisting of a drill shank having a drill point and of a transition section which adjoins the drill shank in the axial direction and which merges into a clamping shank, the transition section being heat-treated in such a way that it has higher bending elasticity compared with the clamping shank and/or the drill shank.

13 Claims, 1 Drawing Sheet

DRILLING TOOL

CROSS REFERENCE TO RELATED APPLICATION

This application claims priority to DE 203 03 601.8 filed Mar. 5, 2003, which is currently pending.

BACKGROUND OF THE INVENTION

The present invention relates to a drilling tool. The drilling tool consists of a drill shank having a drill point and a transition section which adjoins the drill shank in the axial direction which merges into a clamping shank.

Such drilling tools have been disclosed, for example, by German Utility Model G 92 16 228. Disclosed in this document is a twist drill and tap which additionally has a countersinking section in front of the clamping shank.

A tool which is disclosed in EP 0 675 782 B1 and which is not of the generic type, is a torque-transmitting tool which is preferably designed as a screwdriver or screwdriver insert. In this case, the tool consists of a hardened steel body which is produced from a uniform material and whose shank region has subsequently been changed in its hardness or strength by the application of heat. However, the driven region and the driving region have not been changed in their hardness or strength. Such torque-transmitting tools are subjected to torsional stress. Annealing is intended to achieve the effect that the shank region twists elastically during torque application until a limit torque is reached, and can be plastically deformed by at least 30° if the limit torque is exceeded.

In a drilling tool of the generic type, it has been found that, when drilling with a portable drill for example, moment reactions occur when the direction of rotation is reversed. For example, after the countersinking these moment reactions cause the user to experience such a counter-reaction that the drilling tool may fracture.

The object of the invention is to provide an improved drilling tool in which the risk of fracture is considerably reduced.

According to the invention, this is achieved in that the transition section is heat-treated in such a way that it has higher bending and torsional elasticity compared with the clamping shank and/or the drill shank.

When the direction of rotation is reversed, the drilling tool can be jerked suddenly. The invention is based on the knowledge that the drilling tool is stressed in particular, in bending and torsion as a result. The known drilling tool fractures due to this torsional stress. To be precise, the fracture occurs in the vicinity of the tap section in a region which amounts to about 30% of the length of the transition section, starting from the end of the tap section.

The bending and torsional elasticity of the drilling tool is improved by the heat treatment according to the invention so that the drilling tool can largely absorb the bending stresses which occur.

The heat-treated drilling tool heat-treated according to the invention is preferably a combined twist drill and tap having a drill shank which consists of a front twist-drill section and a tap section which adjoins the latter, and merges into the transition section. The clamping shank adjoins the transition section in the axial direction with the countersinking section being arranged between the transition section and the clamping shank.

The heat treatment according to the invention achieves the effect that the transition section is substantially more elastic in bending and torsion than the drill shank and/or the clamping shank with the countersinking section located in front.

According to the invention, provision is made for the drilling tool to have a heat-affected region with a main heat zone. The main heat zone lies approximately in a region which amounts to ⅓ of the length of the transition section, starting from the end of the tap section so that the region subjected to the greatest loading is at least heat-treated. The heat-affected region extends on that side of the transition section which points towards the tap section somewhat into the tap section, and ends on the side pointing towards the clamping shank well in front of the countersinking section. The heat-affected region may end, for example, at about half the length of the transition section in front of the countersinking region. However, the heat-affected region may also end directly in front of the countersinking region. This ensures that the countersinking section has the same material properties as the clamping shank and the drill point.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
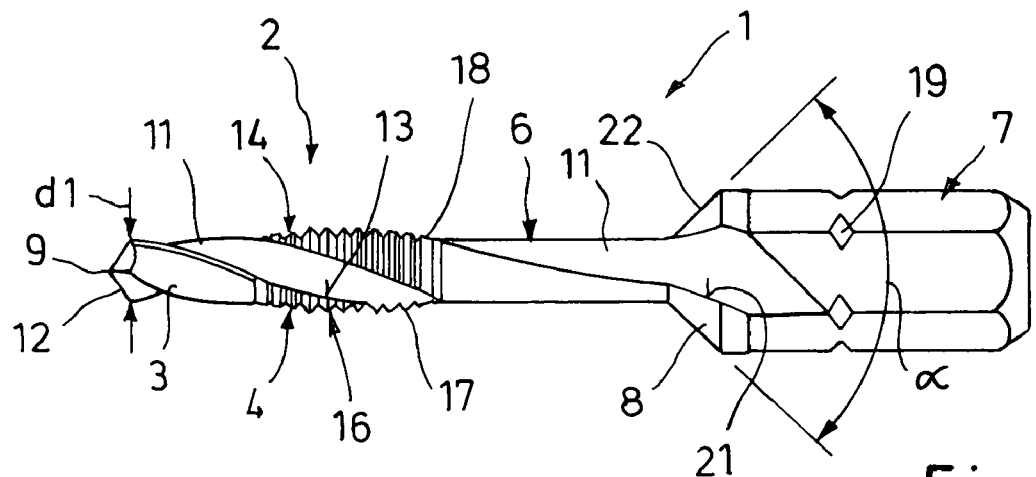
FIG. 1 shows a twist drill and tap in side view.
Figure 2:
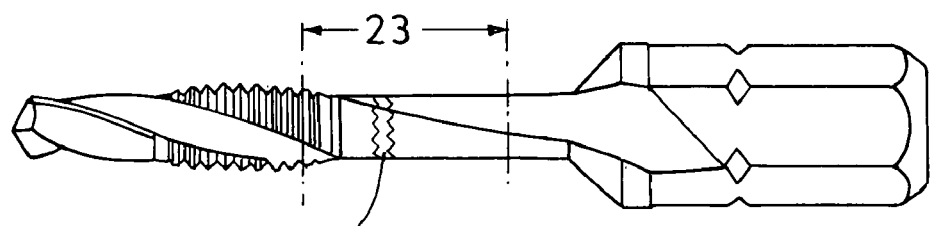
FIG. 2 shows the twist drill and tap according to FIG. 1 with indicated heat-affected region.

In the various figures of the drawing, the different parts are provided with the reference numerals only in FIG. 1, this being dispensed within FIG. 2 in order to clearly show how the heat-affected region is formed.

As can be seen in FIGS. 1 and 2, a twist drill and tap 1, referred to below as "drill", has a drill shank 2 which consists of a front twist-drill section 3 and an adjoining tap section 4. A clamping shank 7 adjoins the tap section 4 via a transition section 6, which in particular is circular in cross section and is formed with a diameter reduced relative to the tap section 4.

A countersinking section 8 is arranged or formed between the transition section 6 and the clamping shank 7 in such a way that a tapped hole produced in one operation with the twist-drill section 3 and the tap section 4 can subsequently be countersunk (deburred, bevelled) with the countersinking section 8.

The twist-drill section 3 has a particular self-centring drill point 9, starting from which at least one flute 11 runs across the drill shank 2. This involves a "spiral-fluted" (helical) design in the preferred exemplary embodiment according to FIGS. 1 and 2. As shown, two diametrically opposite flutes 11 are preferably provided. Beside the flutes 11, which in particular are ground in, cutting edges 12 are formed in the twist-drill section 3 and cutting teeth 13 are formed in the tap section 4.

The tap section 4 consists of a front lead taper 14 which adjoins the twist-drill section 3, and a thread part 16 which adjoins the lead taper 14 and has a "complete" thread-turn profile in cross section. In this case, the lead taper 14 preferably has a relief. The cutting teeth 13, arranged in the region of the lead taper 14, have tooth cross sections which are reduced relative to the "complete" profile of the thread turns arranged in the region of the thread part 16. The cutting teeth 13 increase in the direction of the thread part 16—in accordance with a taper angle of the lead taper 14. Adjoining the "complete" thread part 16 is a thread part 17 having a flattened thread profile.

In the preferred exemplary embodiment shown, the thread part 17 is of tapered design. The cutting teeth 13, arranged in the region of the tapered thread part 17, have tooth cross sections which are reduced relative to the "complete" profile of the thread turns arranged in the region of the thread part 16. The cutting teeth 13 decrease in the direction of the transition section 6 in accordance with the taper angle of the tapered thread part 17. In the exemplary embodiment shown in FIGS. 1 and 2, the lead taper 14 extends over 3 to 3.5 thread turns. The thread-part section 16, having the "complete" thread-turn profile, extends over about 2.5 to 3 thread turns. The adjoining thread part 17 extends over about 5.5 to 6 thread turns. Within the scope of the invention, however, this number of thread turns may also be different in each case.

The tap section 4 has a rear lead taper 18 at its end facing the countersinking section 8.

The twist-drill section 3 has a diameter d1 which is adapted to the core diameter of the respective thread. The diameter d1 is normally equal to an outside diameter d2 of the thread part 16, less the respective thread pitch. For example, in the case of the metric thread M6, d1=6 mm−1 mm=5 mm.

The clamping shank 7 is preferably designed as a hexagon in cross section. However, the size or the cross section of the hexagon corresponds in particular to that of such hexagons which are normally likewise used in "screwdriver bits" (¼ inch). The drill 1 virtually forms a "drill and tap bit" which can be used in an especially simple manner in the hexagon sockets provided in particular in screwdriver machines ("cordless screwdrivers"), but can also be readily used in conventional drilling machine chucks. For locking in a hexagon socket, the clamping shank 7 has retaining notches 19 on its outer circumference in the region of the edges of the hexagon.

Figure 3:
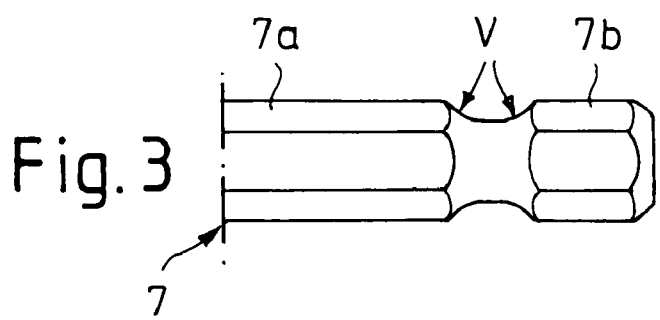
FIG. 3 shows a partial side view only of the clamping shank in an alternative embodiment.

As an alternative to this preferred embodiment, however, it is a principle of the present invention to design the clamping shank 7 with another cross-sectional shape, for example in a circular shape. A design, as shown in FIG. 3, is also possible. The clamping shank 7, which is hexagonal in cross section, has an encircling groove or channel shaped circumferential recess V which divides the clamping shank 7 axially into two sections 7a and 7b. This design corresponds to the DIN 3126 E 6.3 standard and it is preferably used in some regions, e.g. in the USA.

At the countersinking section 8 arranged between the transition section 6 and the clamping shank 7, it is especially advantageous that the axial distance between the end of the tap section 4 and the start of the countersinking section 8 is at least slightly larger than the maximum admissible material thickness of the material to be provided with a tapped through-hole. This ensures that the tap section 4 is already arranged completely outside the corresponding tapped hole during the countersinking phase, i.e. it is no longer in engagement with the thread so that the drill 1 can turn freely during the countersinking, in the course of which, only a very slight axial feed occurs.

The countersinking section 8 has at least one cutting edge 21, two diametrically opposite cutting edges 21 in the exemplary embodiment shown due to the two flutes 11. These cutting edges are arranged obliquely relative to the longitudinal axis of the drill 1 in such a way that a countersinking angle a within the range of 60° to 120°, in particular about 90°, is formed as a result.

The countersinking section 8 is formed by a shank section 22 which widens roughly conically in the direction of the clamping shank 7 starting from the transition section 6. In this case, the cutting edges 21 are formed by the flutes 11 extending in the direction of the clamping shank 7 directly into the region of the conically widening shank section 22. As shown, the flutes 11 preferably even extend somewhat beyond the conical shank section 22 into the region of the clamping shank 7.

The preferred twist drill and tap shown in FIGS. 1 and 2 is produced uniformly from one material. This material is, for example, a high-speed steel having the material number S 6-5-2 (or previously 1.3343 according to the earlier DIN EN 10027—Part 1). Such high-speed steels, due to tempering, have certain material properties. Important in this case is high hardness and low bending elasticity.

According to the invention, however, provision is made for the transition section 6 to be subsequently heat-treated in such a way that higher torsional elasticity compared with the drill shank 2 and the clamping shank 7 and also the countersinking section 8 is achieved as a result. This higher torsional elasticity is around 50% above the original torsional elasticity.

It has been found that a conventional twist drill and tap, e.g. in the case of an M5 thread, withstands a deflection of only 1.53 mm before it is fractured. The same twist drill and tap for an M5 thread, but this time heat-treated according to the invention, withstood a deflection of 2.33 mm under the same test conditions.

According to the invention, the drill 1 has a heat-affected region 23 with a main heat zone 24. The main heat zone 24 is preferably arranged at about ⅓ of the axial length of the transition section 6, starting from the end of the rear lead taper 18. The heat-affected region 23 extends on that side of the transition section 6 which points towards the tap section 4 somewhat into the rear lead taper 18, and ends on the side pointing towards the clamping shank well in front of the countersinking section 8. The heat-affected region 23 may end, for example, at half the length of the transition section 6, but may also end directly in front of the latter.

Such an improvement in the bending elasticity is preferably achieved by means of a high-frequency system for inductive heating. In this case, via infrared radiation pyrometer, both the temperature and the reaction time can be monitored and thereby accurately controlled.

An exemplary high-frequency system can be set, for example, within a temperature range of 600° C. to 900° C. The high-frequency system has a temperature-control device for non-contact temperature monitoring (infrared radiation pyrometer). The main heat zone 24 is detected by means of measuring spot marking. In this case, the actual temperature can be set in such a way that a lower temperature is set in the case of drills for producing drill holes of small diameter, e.g. for M3. A higher temperature is set in the case of drills for producing drill holes of larger diameter, e.g. for M10.

A very short reaction time of the set temperature is especially advantageous. The reaction time is preferably only about 0.5 to 2 seconds.

Due to both the accurate positioning and the short heating within the seconds range, cooling of the clamping shank 7, together with the countersinking section 8 located in front, and the drill shank 2 may advantageously be dispensed with.

Furthermore, the hardness values were considerably reduced. The preferred high-speed steel normally has a hardness of 65 (measured in HRA (Rockwell C)). Such steels can absorb elastic deformations in the event of torsional stresses. However, there is virtually no plastic deformability and immediate fracture occurs. According to the invention, the bending and torsional elasticity is improved by the heat treatment with a hardness being obtained within the range around approximately HRA 38 to 42 (Rockwell C). Further reduced hardness values in the area of the heat-affected region 23 can be gathered from the following table for two exemplary embodiments (in each case with a tolerance of ±2):

| Thread to be produced | M3 | M4 | M5 | M6 | M8 | M10 |
|---|---|---|---|---|---|---|
| Hardness HRA (Rockwell C) approx. | | | | | | |
| Design A | 38 | 40 | 42 | 40 | 40 | 40 |
| Preferred design B | 39 | 40 | 40 | 41 | 41 | 42 |

The invention is not restricted to the exemplary embodiments shown and described, but also comprises all embodiments having the same effect within the scope of the invention. In particular, the twist-drill section 3 may have a drill point 9 which is a split point. Furthermore, the twist drill and tap described can be used for producing tapped holes in the size M3 to M10 for example.

While the above description constitutes the preferred embodiment of the present invention, it will be appreciated that the invention is susceptible to modification, variation and change without departing from the proper scope and fair meaning of the accompanying claims.

The invention claimed is:

1. A method of producing a drilling tool of the type formed as a single integral piece comprising a transition section integrally formed between a drill shank and a clamping shank with the transition section being subjected to a heat treatment in such a way that it is given higher bending and torsional elasticity compared with the clamping shank and the drill shank within a region subjected to the heat treatment.

2. A drilling tool of the type having a drill shank with a drill point and a transition section which adjoins the drill shank in the axial direction and which merges into a clamping shank, the drilling tool comprising the drill shank, transition section and clamping shank forming a single integral piece, the transition section being heat-treated such that it has higher bending and torsional elasticity compared with at least one of the clamping shank and the drill shank, the drill shank forming a front twist-drill section and an adjoining tap section, the transition section adjoining the tap section with the clamping shank, a countersinking section being arranged between the transition section and the clamping shank.

3. A drilling tool according to claim 2 wherein the tap section consists of a front lead taper adjoining the front twist-drill section and a thread part which adjoins the front lead taper and has teeth with a complete thread profile in cross section, the front lead taper having teeth with cross sections which are reduced in height relative to the teeth of the complete thread profile, a rear lead taper having teeth which are reduced in height relative to the complete thread profile of the thread part.

4. A drilling tool according to claim 2 wherein the tap section has a rear lead taper at its end facing the countersinking section.

5. A drilling tool according to claim 2 wherein the countersinking section has at least one cutting edge.

6. A drilling tool according to claim 2 wherein the countersinking section has two diametrically opposite cutting edges which are arranged obliquely relative to a longitudinal axis of the drill such that a countersinking angle ($\alpha$) within the range of 60° to 120° is formed.

7. A drilling tool according to claim 3 wherein the drilling tool has a heat-affected region with a main heat zone which is arranged in the transition section at least at about 30% of the length of the transition section starting from the rear lead taper and ending at the countersinking section.

8. A drilling tool according to claim 7 wherein the heat-affected region runs towards the tap section and ends within the rear lead taper.

9. A drilling toot according to claim 7 wherein the heat-affected region runs towards and ends before the countersinking section.

10. A drilling tool according to claim 2 formed of a high-speed steel, the high-speed steel including materials having a material number 1.3343 according to DIN EN 10027 Part 1, or S 6-5-2.

11. A drilling tool according to claim 2 wherein the clamping shank includes a hexagonal cross section and further includes one or more retaining notches in corners of the hexagonal cross section, an encircling groove, or channel-shaped circumferential recesses.

12. A method according to claim 1 wherein the heat treatment is carried out inductively with a high-frequency system within a temperature range of 600°C. to 900°C.

13. A method according to claim 12 wherein the heat treatment is carried out with a reaction time of 0.5 to 2 s.

* * * * *